Jan. 1, 1929.
R. W. FOYLE
LUBRICANT COMPRESSOR
Filed April 25, 1924
1,697,234
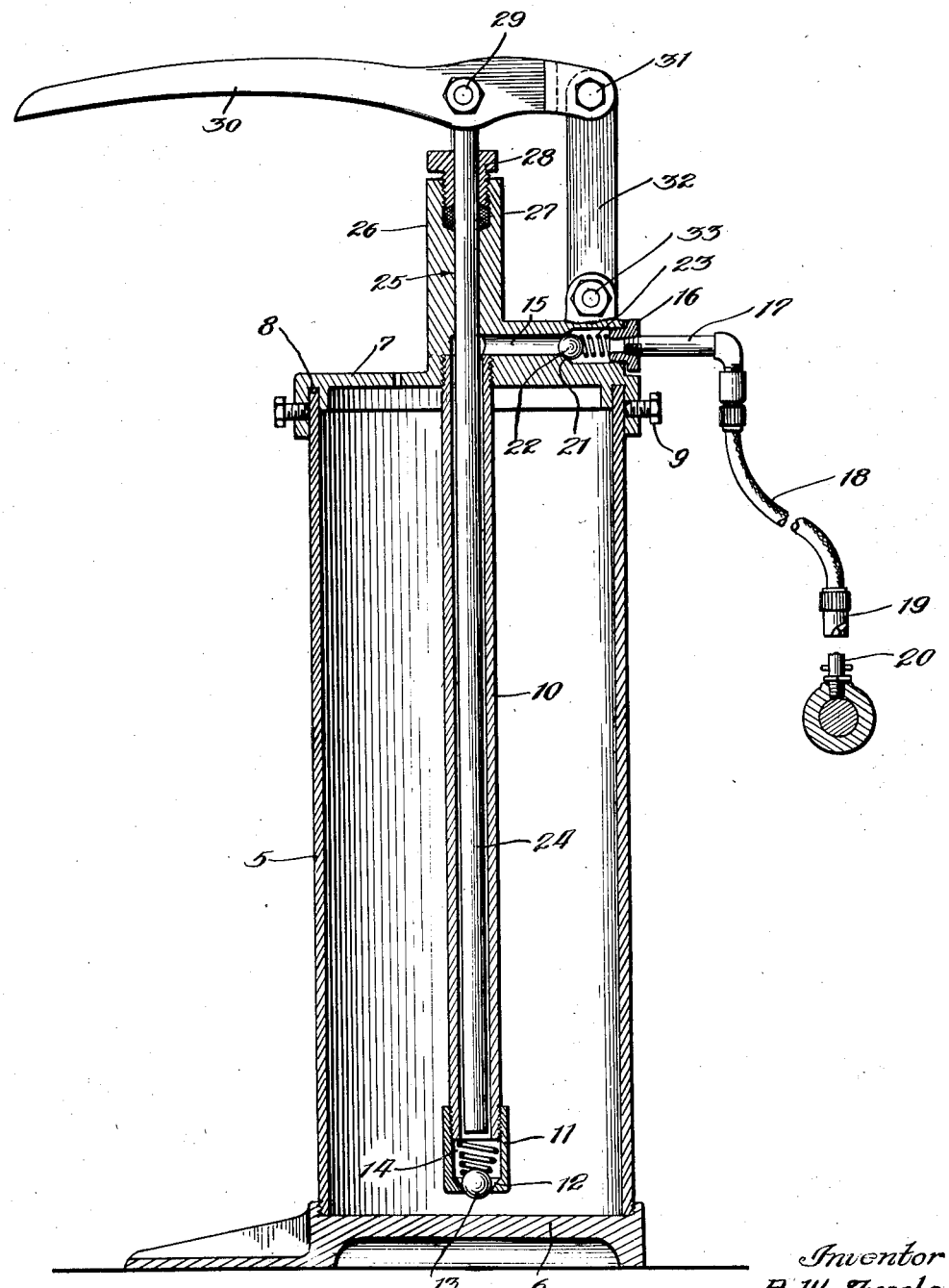
Inventor
R. W. Foyle
Earl L. Pierce
Atty.

Patented Jan. 1, 1929.

1,697,234

UNITED STATES PATENT OFFICE.

ROBERT W. FOYLE, OF SAN FRANCISCO, CALIFORNIA, ASSIGNOR TO ALEMITE MANUFACTURING CORPORATION, OF CHICAGO, ILLINOIS, A CORPORATION OF DELAWARE.

LUBRICANT COMPRESSOR.

Application filed April 25, 1924. Serial No. 708,934.

My invention relates to lubricant compressors, and more particularly to that type of compressor for high pressure lubricating systems, wherein the compressor stands on the floor or other suitable support rather than being held in the hand of the operator. The compressor here shown is particularly intended for lubricating the several bearings of automobiles, machines, etc., the compressor being provided with coupling means for detachably engaging successive lubricant receiving nipples on the bearings.

The objects of my invention are:

First, the provision of a high pressure pump adapted to be secured upon the upper end of a lubricant reservoir and having the inlet to the displacement chamber of the pump at substantially the bottom of the reservoir, whereby lubricant will flow under gravity to feed the pump, thus avoiding the necessity of lifting the lubricant by suction or otherwise.

Second, the provision of a compressor of this type which requires a minimum of machining and accurate workmanship, and which may easily be made up for reservoirs of varying depths.

Third, the provision of a compressor of the type described, which is simple, compact and sturdy.

Further objects of my invention are to be found in the following description and embodiment thereof as illustrated in the accompanying drawing.

Referring to the drawing, which shows a longitudinal vertical section of my lubricant compressor, a cylinder 5 of large diameter constituting a lubricant reservoir is screw threaded into a base 6, which forms a bottom closure therefor. A casing 7 which forms a frame for the pumping mechanism closes the upper end of the cylinder 5, the casting being provided at its periphery with a downwardly opening annular groove 8, into which the upper end of the cylinder fits. Clamping means, such as set screws 9, hold the casting securely upon the cylinder.

A pipe 10, which may be an ordinary gas pipe, is disposed preferably centrally within the cylinder 5, the upper end of the pipe being threaded into the casting 7, the pipe extending downwardly to a point adjacent the base 6. The lower end of the pipe 10 is provided with a cap fitting 11 which carries, at its lower end, a seat 12 for a ball check valve 13, yieldingly held against the seat by a light spring 14. A cross bore 15 extends radially of the casting 7 from the upper end of the pipe 10 to a reducing bushing 16, within which is secured the end of the conduit 17, which in turn is connected with a flexible conduit 18 carrying at its end a coupling 19 provided with bayonet slots for successively detachably engaging the cross pin of any one of a plurality of nipples 20 in the several bearings to be lubricated. At its outer end, the cross bore 15 is provided with a seat 21 for a ball check valve 22, yieldingly held against its seat by a light spring 23.

Disposed within the pipe 10, is a rod 24 of diameter somewhat smaller than the inner diameter of the pipe 10, the rod extending upwardly through the bore 25 of a boss 26 on the casting 7. The rod 24 fits tightly but reciprocably within the bore 25, packing 27 and a follower 28, provided to insure a fluid-tight bearing for the rod. The upper end of the rod 24 is pivotally secured by a bolt 29 to a hand lever 30, the fulcrum 31 of which is at the free end of a link 32 pivotally mounted at 33 on the casting 7.

In using the compressor, the operator lifts the lever 30, sliding the rod 24 upwardly. The head of lubricant within the reservoir and atmospheric pressure upon the lubricant cause the check valve 13 to yield, and lubricant to flow into the lower end of the pipe 10 until the space represented by the volume of the rod withdrawn has been refilled. The operator then pushes the handle 30 downwardly, the rod 24 again sliding to its lower position. The check valve 13 having closed, the lubricant thus displaced travels upwardly between the rod and the bore of the pipe 10 through the passage 15, past the yielding check valve 22, and into the conduit 18, from which it is delivered to a nipple 20. The fluid-tight fit of the rod 24 in the bore 25 prevents lubricant, under the pressure developed in the pump, from flowing out along the upper end of the rod. It is to be noted that because of the length of the lever 30 and the comparatively small diameter of the rod 24, that a very high pressure may be developed by the pump, and further that the pump has no particular length of stroke, the distance through which the rod 24 reciprocates being whatever is convenient for the operator. It will be seen that no positive or weighted follower need be provided for the lubricant in the reservoir, since the displacing action takes place at the lower end of the pipe 10 where the lubricant will always flow under gravity into the pipe 10.

Among the many changes that may be made in the device here shown, without departing from the spirit or scope of my invention, I contemplate that the reservoir, rather than being a part of the compressor, may be in the form of a steel barrel or other container in which the lubricant is shipped, making it unnecessary for the operator to refill the reservoir.

I claim:—

1. A lubricant compressor comprising a lubricant reservoir, a closure for said reservoir bored to receive and guide a plunger rod, a tube attached to said closure in communication with the bore therein and extending to a low point in said reservoir, the internal diameter of the tube being slightly greater than the bore of said closure, a plunger received within the bore of said closure and tube adapted for reciprocation therein, an outwardly closing valve at the lower end of the tube, a discharge conduit above the upper edge of the lubricant reservoir in communication with the interior of said tube, an inwardly closing valve in said discharge conduit, and means for reciprocating said plunger whereby liquid may be dispensed at high pressure irrespective of the length of plunger stroke.

2. A lubricant compressor comprising a reservoir adapted to contain lubricant, a closure for said reservoir detachably secured thereto and having a bore communicating with the reservoir, a tube carried by said closure and extending downwardly to a point in proximity to the bottom of the reservoir, the bore of the tube being of slightly greater diameter than the bore of the closure with which it communicates, an outwardly closing check valve at the lower end of the tube, a plunger rod reciprocably mounted in said closure bore and guided thereby, packing means carried by said closure and surrounding said plunger rod to prevent leakage therealong, a branch conduit carried by said closure communicating with the interior of said tube, an inwardly closing check valve in said branch conduit, means beyond said second-named check valve for dispensing fluid from the reservoir, and power means for reciprocating the plunger rod, whereby upon its downward movement it will displace fluid contained in the tube and thereby force such fluid past said second-named check valve, and upon return movement of said plunger rod an additional supply of fluid from the reservoir will flow into the tube by gravity.

In witness whereof, I hereunto subscribe my name this 16th day of April, 1924.

ROBERT W. FOYLE.